United States Patent [19]

Mahoney

[11] 3,789,628

[45] Feb. 5, 1974

[54] METHOD FOR CONTROLLING FURNACE EMISSIONS
[75] Inventor: William P. Mahoney, Muncie, Ind.
[73] Assignee: Ball Corporation, Muncie, Ind.
[22] Filed: Dec. 23, 1971
[21] Appl. No.: 211,761

[52] U.S. Cl............................. 65/27, 65/168, 55/85
[51] Int. Cl............................................... C03b 5/16
[58] Field of Search..... 65/27, 168; 55/DIG. 30, 84, 55/85, 86, 87, 91, 92, 220

[56] References Cited
UNITED STATES PATENTS
2,975,555   3/1961   Zellers, Jr. et al...................... 65/27
3,132,192   5/1964   Lessmann...................... 55/DIG. 30

Primary Examiner—Arthur D. Kellogg
Attorney, Agent, or Firm—Gilbert E. Alberding

[57] ABSTRACT

Method for scrubbing furnace emissions, and particularly glass furnace emissions, from furnace exhausts, by spraying an aqueous solution of sodium silicate into the hot exhaust gases as the exhaust gases are being exhausted through the glass furnace exhaust stack, collecting the precipitated prill and recycling the precipitate back into the glass batch materials.

5 Claims, No Drawings

METHOD FOR CONTROLLING FURNACE EMISSIONS

BACKGROUND OF THE INVENTION

1. Field of the Invention

This invention relates generally to purification processes and, more particularly, to a method for scrubbing and recycling exhaust gases emitted from a furnace.

2. Discussion of the Prior Art

It is oftentimes necessary, particularly in view of the growing knowledge of the dangers of contaminating our atmosphere, to be concerned with the problem of emissions and particularly with the problem of industrial emission. Air pollution is caused by many substances that are released to the atmosphere in one manner or another attendant to the practice of necessary and beneficial industrial processes. With each particular substance, there exists unique problems of purification of emission materials. The most desirable approach is to remove the objectionable materials for recycle thereby avoiding secondary problems of disposal or pollution. Many general solutions are well-known and many methods for cutting back air pollution are particularly well-known. Scrubbing gases, for example, is a popular method for cleansing the gases of particular matter prior to the gases being emitted to the atmosphere. However, depending upon the type of gas that is emitted to the atmosphere, the scrubbing method may be ineffective if, in fact, the scrubbing solution does not display pronounced affinity for the particular matter to be scrubbed or is detrimental to the basic processes. Thus, to merely set up a scrubbing method may not be fully effective, absent the knowledge of the particular problems to be solved and a discovery of an effective scrubbing method in light of the problems to be overcome.

U. S. Pat. Nos. 3,356,565 and 2,198,745 are examples of scrubbing processes as previously employed.

SUMMARY OF THE INVENTION

This invention includes a method for scrubbing, for example, exhaust gases from a glass furnace with an aqueous solution of sodium silicate, the method being particularly dependent upon the nature of the glass furnace operation and the resulting particulates and gases that may be emitted from the operation.

It is, therefore, an object of this invention to provide a method for scrubbing glass furnace emission particulates and gases prior to those gases being emitted to the atmosphere.

It is a further object of this invention to provide a method for scrubbing gases emitted from a glass furnace operation wherein the scrubbing solution is compatible with the glass batch in the furnace and which, in fact, returns the scrubbed particles back into the glass batch.

It is a further object of this invention to provide a method for scrubbing glass furnace exhaust gases wherein the scrubbed particulates can be recycled and reused in the glass batch.

These and other objects and advantages of this invention will become evident upon further consideration of this specification and appended claims.

DETAILED DESCRIPTION OF THE INVENTION

In a glass furnace operation, the glass batch is continually provided to and passed through the furnace where it is melted and further processed for glass formation. The step of melting glass requires extremely high temperatures within the furnace. Such high temperatures cause numerous reactions among the components of the glass batch mixture thereby evolving or emitting gases and particulates from the glass batch mixture and melt. The gases which evolve from the glass batch mixture and melt during the melting and heating process have been released to the atmosphere through tall stacks in the top of the furnace. According to the instant invention, a simple scrubbing apparatus is employed within the stack flow channel for spraying a solution down into the stack emissions, preferably countercurrent to the evolving gases and particulates. It is most desirable that the solution sprayed into the evolving gases be an aqueous sodium silicate solution.

The physical arrangement of the scrubber is not critical and the various conventional apparatus and approaches will be apparent to those skilled in the art. For instance, the furnace emissions can be passed through a horizontal chamber wherein a spray of an aqueous sodium silicate solution is introduced at the top to pass vertically through the emissions by gravity. Constituents removed from the emissions fall to the floor of the chamber where they may be collected for recycle. Or a spray of aqueous sodium silicate solution can be introduced downwardly in the stack proper. A separator located lower in the stack would then be utilized to collect the removed constituents for recycle.

Simmilarly, the operating parameters of the instant invention are not critical. While it is desirable to utilize a solution of sodium silicate which is near saturation, it is not necessary to do so. The reason for this will be apparent from a consideration of the normal function of an aqueous sodium silicate solution utilized in the method of the instant invention. When introduced into the hot furnace gases, the water, of course, tends to evaporate from a droplet into the exhaust stream. The sodium silicate then forms a small, sticky sphere with physical and chemical affinity for the more objectionable of the furnace emissions. These include $NO_x$, sulfur oxides, and particulate matter. In moving through the furnace emissions, the sticky sphere collects the more objectionable constituents. Then, as the remaining water is removed from the sphere, it forms a prill, i.e., a hollow sphere.

It will be appreciated by those skilled in the art that the sodium silicate will more rapidly form into a sticky sphere if the solution is near saturated when the droplet is formed. Also, it will be apparent that smaller droplets form a higher surface area for a given amount of sodium silicate solution. On the other hand, the droplets should not be so small and the solution so concentrated that the water flashes from the droplets to rapidly as to plug the orifice through which the droplet is formed. Also, the droplet should not be so small as to be carried along with the furnace gases. Since these considerations are functions of furnace gas temperatures, flow rates, etc., there is no single set of best operating conditions. However, those skilled in the art will be able to readily adapt the unique scrubbing properties of sodium silicate, as taught by the instant invention, to numerous physical environments.

The prill with the entrapped furnace gas emissions therewith is entirely compatible with glass batch material. The dry, concentrated prill and entrapped materials may be directly recycled into the glass batch. This is in counter distinction to many materials which would serve to entrap emission constituents but which would be incompatible with the glass batch, and thus would produce a useless, wasteful residue. Therefore, one of the more important features of the method of the instant invention is not only the great propensity shown by sodium silicate as a scrubbing agent, but its complete compatibility as glass-making material.

Upon consideration of this specification and claims, many modifications and variations of the described invention will become easily apparent to one skilled in the art. However, all such modifications and variations are intended to be included as a part of this invention, as this invention is particularly defined by the claims.

What is claimed is:

1. A method of scrubbing glass furnace emissions containing gases and particulates, comprising: passing said glass furnace emissions through droplets of an aqueous sodium silicate solution, said emissions being positively drawn through the exhaust gas channel of the furnace, said droplets forming spheres therein whereby the emissions are entrapped in said spheres, and collecting the spheres having entrapped emissions for recycle.

2. The method of claim 1 wherein the sodium silicate droplets are passed through the emissions in a direction other than the direction of flow of the emissions.

3. The method of claim 1 wherein the said sodium silicate droplets are sprayed into said emissions whereby objectionable constituents are scrubbed from said furnace emissions.

4. A method for removing objectionable constituents from hot glass furnace emissions, comprising: introducing droplets of a near saturated aqueous solution of sodium silicate into said emissions, said emissions being positively drawn through the exhaust gas channel of the furnace, removing a portion of the water from the sodium silicate solution as a result of the heat of said emissions to form a sticky droplet of sodium silicate, attracting said objectionable constituents onto, into, and with said sticky droplets of sodium silicate, removing substantially all of the water from the sodium silicate sticky droplets to form a dry prill of sodium silicate and the removed objectionable constituents, and collecting the dry prills.

5. A method of scrubbing hot glass furnace emissions containing gas and particulates comprising deliverying an aqueous sodium silicate solution under pressure to a position in an emission flow path of the furnace, spraying the aqueous sodium silicate solution to form droplets in the exhaust gas channel of the furnace countercurrent to the emissions flow path, said emissions being positively drawn within said path, evaporating off the water from said droplets to form tacky spheres thereby scrubbing objectionable constituents therefrom, and collecting the scrubbed constituents below the spray location for recycling to the furnace.

* * * * *